United States Patent
Giardino et al.

(10) Patent No.: US 8,236,171 B2
(45) Date of Patent: Aug. 7, 2012

(54) PROCESS FOR IMPROVING QUALITY AS A FUEL OF HYDROTREATED HYDROCARBON BLENDS

(75) Inventors: Roberto Giardino, Milan (IT); Vincenzo Calemma, Milan (IT); Ugo Cornaro, Bergamo (IT)

(73) Assignees: ENI S.p.A, Rome (IT); Enitecnologie S.p.A., San Donato Milanese (IT)

( * ) Notice: Subject to any disclaimer, the term of this patent is extended or adjusted under 35 U.S.C. 154(b) by 584 days.

(21) Appl. No.: 11/480,369

(22) Filed: Jul. 5, 2006

(65) Prior Publication Data

US 2007/0187295 A1  Aug. 16, 2007

(30) Foreign Application Priority Data

Jul. 8, 2005 (IT) .............................. MI2005A1295

(51) Int. Cl.
  *C10G 45/62* (2006.01)
  *C10G 45/64* (2006.01)

(52) U.S. Cl. .............. 208/143; 208/138; 502/74; 502/77

(58) Field of Classification Search .................. 208/142, 208/143, 144, 134, 138; 502/74, 77, 103
See application file for complete search history.

(56) References Cited

U.S. PATENT DOCUMENTS

| | | | |
|---|---|---|---|
| 4,828,675 A * | 5/1989 | Sawyer et al. | 208/57 |
| 2002/0050466 A1 | 5/2002 | Baird, Jr. et al. | |
| 2003/0038059 A1 * | 2/2003 | Zanibelli et al. | 208/213 |
| 2003/0057135 A1 * | 3/2003 | Benazzi et al. | 208/57 |
| 2005/0269245 A1 * | 12/2005 | Huve | 208/89 |

FOREIGN PATENT DOCUMENTS

| | | |
|---|---|---|
| EP | 0 582 347 A1 | 2/1994 |
| WO | WO 02/08156 A1 | 1/2002 |
| WO | WO 2004/053027 * | 6/2004 |

OTHER PUBLICATIONS

Zhang, Wenmin and Panagiotis G. Smirniotis, "Dealuminated zeolite-based composite catalysts for reforming an industrial naphthene-rich feedstock", 1998 (no month), Applied Catalysis A: General 168, pp. 113-130.*

* cited by examiner

*Primary Examiner* — Walter D Griffin
*Assistant Examiner* — Renee E Robinson
(74) *Attorney, Agent, or Firm* — Oblon, Spivak, McClelland, Maier & Neustadt, L.L.P.

(57) ABSTRACT

A process is described for improving the quality as a fuel of hydrotreated hydrocarbon blends by reaction with hydrogen in the presence of a bifunctional catalytic system comprising one or more metals selected from Pt, Pd, Ir, Ru, Rh and Re, and a silico-aluminate of an acidic nature, selected from a micro-mesoporous silico-alumina and a zeolite belonging to the MTW family. The process of the invention produces an increase in the cetane index and a decrease in the density and T95.

29 Claims, 1 Drawing Sheet

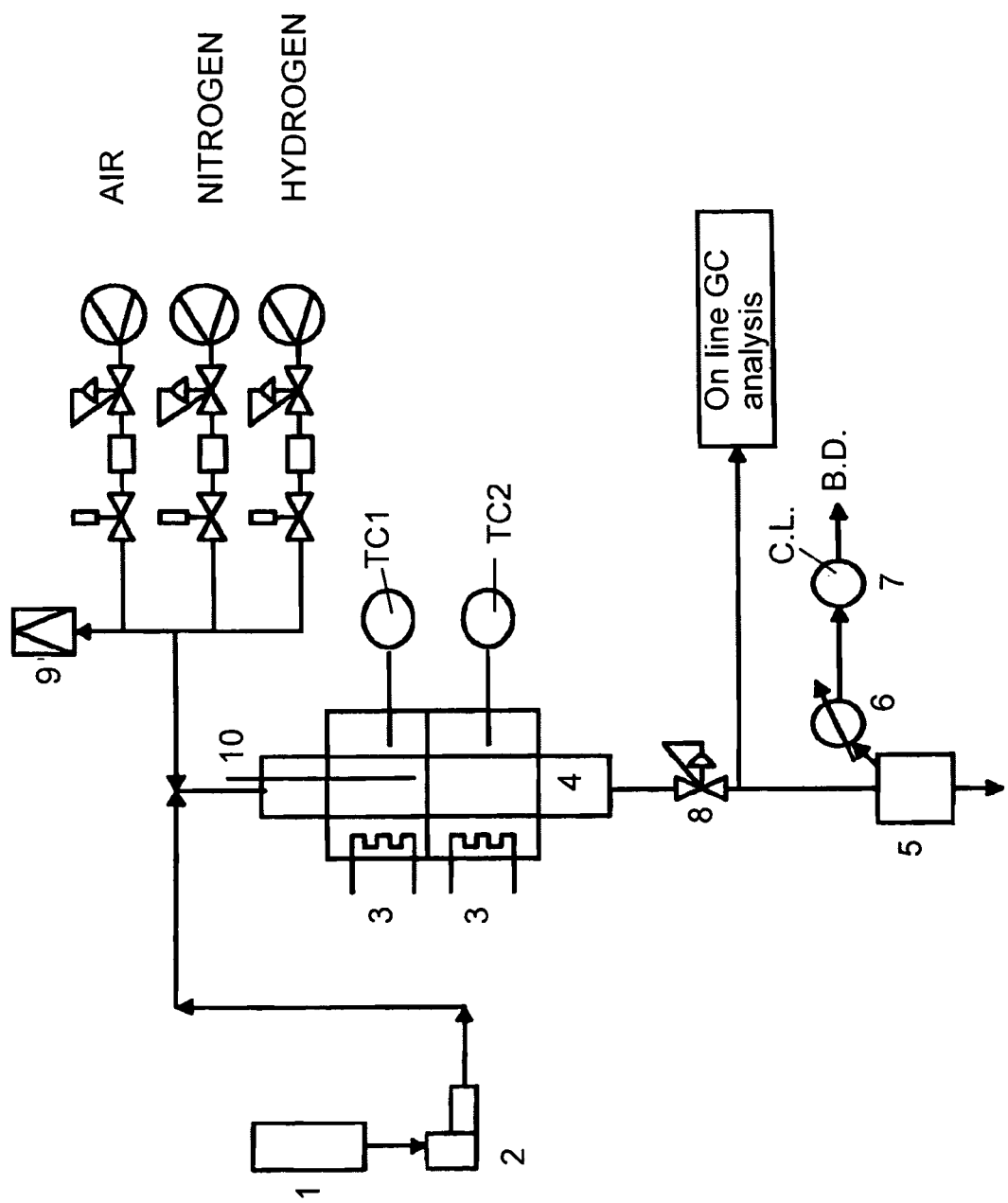

PROCESS FOR IMPROVING QUALITY AS A FUEL OF HYDROTREATED HYDROCARBON BLENDS

The present invention relates to a process for improving the quality as a fuel of hydrotreated hydrocarbon blends. In particular, it relates to a partial dearomatization process of hydrotreated hydrocarbon blends with the limited formation of products have a lower molecular weight with respect to the charge. The hydrotreated hydrocarbon blends can be hydrotreated oil cuts or hydrotreated cuts of a petrochemical origin. This process comprises the enrichment of blends resulting in alkyl-benzene compounds, at least partially deriving from the conversion of the naphtho-aromatic structures contained in said hydrotreated blends. The process of the present invention produces an increase in the cetane index and a reduction in the density of the blends obtained, wherein said reduction in the density is equivalent to that obtained by means of total dearomatization, but it is effected with a much lower hydrogen consumption. The process is carried out in the presence of a bifunctional catalytic system comprising one or more metals selected from Pt, Pd, Ir, Rh, Ru and Re, and a silico-aluminate of an acidic nature selected from a micro-mesoporous silico-alumina having a suitable composition and a zeolite belonging to the MTW family.

The production of fuels for use in new generation engines which reduce emissions is one of the major problems of the refinery industry.

The definition of future fuel specifications is still a topic of discussion, but evolution towards increasingly restrictive regulations with respect to emissions is certain, and this will require products with significantly different characteristics than those currently in use, also from a compositional point of view.

As far as gas oil for auto-vehicles is concerned, in addition to the reduction in the sulfur content, other important aspects linked to the quality which will probably be the object of stricter regulations in the near future, are: the content of condensed polyaromatic compounds, the density, T95 (temperature at which 95% of the product is distilled) and the cetane number or index.

Most probably, not all of the characteristics mentioned above will be the object of future regulations, however the reduction in aromatic compounds, and more particularly polyaromatic compounds, is a highly desirable result due to their direct impact on emissions (Fuel, Volume 82, Issue 4, March 2003, Pages 385-393, "The sources of polycyclic aromatic compounds in diesel engine emissions"). From a general point of view, the reduction in the content of aromatic structures through their hydrogenation and subsequent hydrodecyclization until normal and isoparaffins are obtained, causes a distinct change in the properties of diesel fuels, such as:
- a decrease in the density;
- an increase in the cetane number;
- a reduction in emissions;
- a reduction in the boiling point with the same number of carbon atoms present in the molecule.

Against these changes, however, there is a considerable hydrogen consumption which significantly influences the inexpensiveness of the process.

Process commercially available for obtaining medium distillates with a reduced content of aromatic compounds are currently: dearomatization and hydrocracking.

In the former case, the upgrading of the charge essentially takes place by the hydrogenation of the aromatic structures with the formation of the corresponding naphthene structures. In this case there is:
- a reduction in the density;
- a reduction in the boiling point;
- an increase in the cetane number;
- a limited formation of products with a lower molecular weight with respect to the charge.

The catalysts generally used in this process consist of a metallic phase deposited on a carrier having a medium-low acidity. It should be pointed out, however, that the hydrogenation of the aromatic structures causes high hydrogen consumptions.

In the latter case, hydrocracking, the greater or lesser formation of products with a lower molecular weight with respect to the charge, is associated with the partial saturation of the aromatic structures. The catalysts used in this case are of the bifunctional type, i.e. consisting of metals which have a dehydrogenating function supported on a generally more acid phase than that of the carriers used in the previous case.

The method which has been more recently proposed for considerably improving the characteristics of medium distillates envisages the saturation of the aromatic rings followed by the selective opening of the naphthene ring in the corresponding aliphatic chains with as little a formation as possible of low molecular weight products. In this case, in the ideal situation in which all the aromatic structures are transformed into open-chain aliphatic compounds, there would be a product essentially consisting of a mixture of iso- and normal paraffins, thus obtaining the maximum benefit in terms of density, boiling point and cetane number (U.S. Pat. Nos. 5,763,731; 6,103,106). This solution is obviously jeopardized by a high hydrogen consumption and, generally, high yields to cracking products, which make the process nonadvantageous from an economical point of view.

MI2004A000798 describes the upgrading of distillates containing naphthene compounds by the transformation of these compounds into the corresponding paraffinic derivatives, which uses catalysts containing Pt, Pd, Ir, Rh, Ru and Re and an acid silico-aluminate selected from a suitable micromesoporous silico-alumina and an MTW zeolite.

The Applicants have now unexpectedly found a process which produces a substantial improvement in the properties of hydrotreated hydrocarbon cuts, in particular in terms of cetane index (number), density and distillation curve, which has proved to be equivalent to that obtained by the simple hydrogenation of aromatic structures. The process, object of the invention, causes a negligible formation of low molecular weight products and requires lower hydrogen consumptions with respect to the known processes.

A first object of the present invention therefore relates to a process for improving the properties as a fuel of hydrotreated hydrocarbon blends which comprises the treatment of said blends, in the presence of hydrogen, with a catalytic system comprising:
a) one or more metals selected from Pt, Pd, Ir, Ru, Rh and Re
b) a silico-aluminate of an acidic nature selected from a zeolite belonging to the MTW group and a completely amorphous micro-mesoporous silico-alumina having a molar ratio $SiO_2/Al_2O_3$ ranging from 30 to 500, a surface area greater than 500 $m^2$/g, a pore volume ranging from 0.3 to 1.3 ml/g, an average pore diameter lower than 40 Å.

BRIEF DESCRIPTION OF THE DRAWINGS

The FIGURE shows a diagram of a continuous laboratory plant in which catalytic tests were carried out.

The hydrotreated hydrocarbon blends used in the process of the present invention can derive from oil cuts or cuts of a petrochemical origin which have been subjected to hydrotreatment. The process of the present invention allows a substantial increase in the cetane index (number) to be obtained together with a decrease in the density and T95 of the hydrotreated hydrocarbon blends. The blends thus obtained are, among other things, enriched in alkylbenzene compounds which at least partially derive from the partially hydrogenated polycyclic aromatic compounds of the benzonaphthene type present in the hydrocarbon cuts which have undergone a hydrotreatment.

The catalysts used in the present invention are therefore unexpectedly capable of directing the process towards the formation of alkylbenzene structures by the hydrodecyclization of the naphthene ring of naphtho-benzene or dinaphtho-benzene structures, thus obtaining the best possible compromise between hydrogen consumption and improvement in the properties of the product, at the same time limiting both the complete hydrogenation reaction of the aromatic rings and the cracking reaction to form light products. The formation of light products by means of the hydrocracking reaction, should this take place, would, in this case, have a double disadvantage: a decrease in the yields in the product of interest and a greater hydrogen consumption.

The component of an acidic nature (b) of the catalytic composition used in the present invention can be selected from zeolites of the MTW type: the MTW group is described in Atlas of zeolite structure types, W. M. Meier and D. H. Olson, 1987, Butterworths. The zeolite of the MTW structural type, which can be appropriately used in the present invention, is a silico-aluminate with a molar ratio $SiO_2/Al_2O_3$ greater than or equal to 20. This zeolite and its preparation are described in A. Katovic and G. Giordano, Chem. Ind. (Dekker) (Synthesis of Porous Materials) 1997, 69, 127-137. According to a preferred aspect, the zeolite ZSM-12, described in U.S. Pat. No. 3,832,449 and in Ernst et al., Zeolites, 1987, Vol. 7, September, is used.

In the preparation of the catalytic composition, the zeolite is used in its acidic form.

If the component of an acidic nature (b) is a silico-alumina, a preferred aspect is for the molar ratio $SiO_2/Al_2O_3$ to range from 50 to 300. According to another preferred aspect, the silico-alumina has a porosity ranging from 0.4 to 0.5 ml/g.

Completely amorphous micro-mesoporous silico-aluminas which can be used for the present invention, called MSA, and their preparation are described in U.S. Pat. No. 5,049,536, EP 659,478, EP 812,804. Their XRD spectrum from powders does not have a crystalline structure and does not show any peak.

Catalytic compositions which can be used in the present invention, wherein the acid component is a silico-alumina of the MSA type are described in EP 582,347.

The silico-aluminas which can be adopted for the process of the present invention can be prepared, according to EP 659,478, starting from tetra-alkylammonium hydroxide, an aluminum compound hydrolyzable to $Al_2O_3$, and a silicon compound hydrolyzable to $SiO_2$, wherein said tetraalkylammonium hydroxide is a tetra($C_2$-$C_5$) alkylammonium hydroxide, said hydrolyzable aluminum compound is an aluminum tri($C_2$-$C_4$)-alkoxide and said hydrolyzable silicon compound is a tetra($C_1$-$C_5$) alkylorthosilicate: these reagents are subjected to hydrolysis and gelification operating at a temperature equal to or higher than the boiling point, at atmospheric pressure, of any alcohol which is formed as byproduct of said hydrolysis reaction, without the elimination or substantial elimination of said alcohols from the reaction environment.

The gel thus produced is dried and calcined, preferably in an oxidizing atmosphere at a temperature ranging from 500 to 700° C., for a period of 6-10 hours.

The procedure comprises preparing an aqueous solution of tetra-alkylammonium hydroxide and aluminum trialkoxide and the tetra-alkylorthosilicate is added to this aqueous solution, operating at a temperature lower than the hydrolysis temperature, with a quantity of reagents which is such as to respect the molar ratios $SiO_2/Al_2O_3$ from 30/1 to 500/1, tetra-alkylammonium hydroxide/$SiO_2$ from 0.05/1 to 0.2/1 and $H_2O/SiO_2$ from 5/1 to 40/1, and the hydrolysis and gelification are triggered by heating to a temperature higher than about 65° C. to about 110° C., operating in an autoclave at the autogenous pressure of the system or at atmospheric pressure in a reactor equipped with a condenser.

With respect to the metallic component of the catalytic compositions used in the process of the present invention, this is selected from Pt, Pd, Ir, Ru, Rh, Re and their mixtures. According to a particularly preferred aspect of the present invention, the metal is platinum, iridium or their mixtures.

The metal or mixture of metals is preferably in a quantity ranging from 0.1 to 5% by weight with respect to the total weight of the catalytic composition, and preferably ranges from 0.3 to 1.5%.

The weight percentage of the metal, or metals, refers to the metal content expressed as metallic element; in the final catalyst, after calcination, said metal is in the form of an oxide.

Before being used, the catalyst is activated by the known techniques, for example by means of a reduction treatment, and preferably by drying and subsequent reduction. The drying is carried out in an inert atmosphere at temperatures ranging from 25 to 100° C., whereas the reduction is obtained by thermal treatment of the catalyst in a reducing atmosphere ($H_2$) at a temperature ranging from 300 to 450° C., and a pressure preferably ranging from 1 to 50 atm.

The component of an acidic nature (b) of the catalyst used in the process of the present invention can be in the form of an extruded product with traditional ligands, such as for example aluminum oxide, bohemite or pseudobohemite. The extruded product can be prepared according to the methods well known to experts in the field. The component of an acidic nature (b) and the ligand can be premixed in weight ratios ranging from 30:70 to 90:10, preferably from 50:50 to 70:30. At the end of the mixing, the product obtained is consolidated into the desired final form, for example in the form of extruded pellets or tablets.

As far as the metallic phase (a) of the catalyst is concerned, this can be introduced by means of impregnation or ionic exchange. According to the first technique, the component of an acid nature (b), also in extruded form, is wet with an aqueous solution of a compound of the metal, operating, for example, at room temperature, and at a pH ranging from 1 to 4. The aqueous solution preferably has a metal concentration expressed as g/l ranging from 0.2 to 2.0. The resulting product is dried, preferably in air, at room temperature, and is calcined in an oxidizing atmosphere at a temperature ranging from 200 to 600° C.

In the case of alcohol impregnation, the acid component (b) is suspended in an alcohol solution containing the metal. After impregnation, the solid is dried and calcined.

According to the ionic exchange technique, the acid component (b) is suspended in an aqueous solution of a complex or salt of the metal, operating at room temperature and at a pH ranging from 6 to 10. After the ionic exchange, the solid is separated, washed with water, dried and finally thermally treated in an inert or oxidizing atmosphere. Temperatures useful for the purpose are those ranging from 200 to 600° C.

Metal compounds which can be used in the preparations described above are: $H_2PtCl_6$, $Pt(NH_3)_4(OH)_2$, $Pt(NH_3)_4Cl_2$, $Pd(NH_3)_4(OH)_2$, $PdCl_2$, $H_2IrCl_6$, $NH_4ReO_4$, $RuCl_3$, $RhCl_3$.

When the catalytic composition comprises more than one metal, the impregnation is carried out as follows: the acid component (b), also in extruded form, is wet with a solution of a compound of a first metal, the resulting product is dried, it is optionally calcined, and is impregnated with a solution of a compound of a second metal. It is dried and a calcination is then effected in an oxidizing atmosphere at a temperature ranging from 200 to 600° C. Alternatively, a single aqueous solution containing two or more compounds of different metals can be used for contemporaneously introducing said metals.

The hydrotreated hydrocarbon blends which can be subjected to the process of the present invention are blends having boiling points ranging from about 50° C. to about 450° C., preferably from 150° C. to 400° C., more preferably from 180° C. to 380° C. at atmospheric pressure.

In particular, the hydrocarbon cuts can be obtained by the hydrotreatment of oil cuts such as naphthas, diesel, kerosene, jet fuel, light cycle oil (LCO), HVGO or FCC heavy fraction, or by the hydrotreatment of cuts of a petrochemical origin, such as, for example, FOK (fuel oil cracking).

The hydrocarbon cuts subjected to hydrotreatment for providing the hydrotreated hydrocarbon blends used in the process of the present invention have a content of aromatic compounds preferably greater than 20%, and even more preferably greater than 40%, mainly consisting of mono-aromatic compounds, diaromatic compounds and, to a lesser degree, triaromatic compounds. In addition to reducing the hydrogen and nitrogen content, the hydrotreatment varies the nature and composition of the hydrocarbon cut subjected thereto and, among other things, enriches the cut in benzonaphthene compounds.

Hydrotreatment is a process which is well-known to experts in the field and is described, for example, in Catalysis—Science and Technology, Edited by R. Anderson and M. Boudart, Volume 11, Springer-Verlag, of 1996. It can be effected in one or more fixed bed reactors, and the catalytic beds can contain the same or different catalysts. Catalysts based on metallic compounds of Group VI, and/or Group VIII, are usually used, on a carrier, preferably an amorphous carrier, such as, for example, alumina or silica-alumina. Metals which can be well used are, for example, nickel, cobalt, molybdenum and tungsten. Examples of suitable catalysts and their preparation are described in Hydrocracking Science and Technology, J. Scherzer and A. J. Gruia, Marcel Dekker, 1996.

The hydrotreatment catalysts are used in sulfidated form. The sulfidation can be obtained, for example, by sending a suitable charge onto the catalyst, containing a sulfurated compound such as Dimethyldisulfide (DMDS), Dimethylsulfoxide (DMSO) or other compounds which, upon decomposing, lead to the formation of $H_2S$.

The hydrotreatment is preferably carried out at a temperature ranging from 200° C. to 400° C. The pressure normally range from 20 to 100 bars, in relation to the catalyst used, an expert in the field can easily identify the best conditions for the catalyst selected. During the hydrotreatment, the charge undergoes saturation reactions of the aromatic rings with a reduction in the content of aromatic carbon and an enrichment in naphtho-aromatic compounds.

The process of the present invention which allows an increase in the cetane number, a decrease in the density and T95 of hydrotreated hydrocarbon blends, is preferably carried out at a temperature ranging form 240 to 380° C., at a pressure ranging from 10 to 100 atm, at a WHSV ranging from 0.5 to 5 hours$^{-1}$ and with a ratio between hydrogen and charge ($H_2$/HC) ranging from 400 to 2000 Nlt/kg. It is preferable to operate at a pressure greater than 20 atm and lower than or equal to 80 atm, whereas the temperature preferably ranges from 250 to 330° C. when the acid component (b) is a zeolite of the MTW type, whereas it preferably ranges from 300 to 380° C. when the acid component (b) is a silico-alumina.

The following experimental examples are provided for a better illustration of the present invention.

EXAMPLE 1

Preparation of Catalyst A: ZSM-12/1.0% Pt
a) Preparation of the ZSM-12 Zeolite 127 grams of tetra-ethylammonium hydroxide at 40% by weight, in aqueous solution, are added to 24 grams of demineralized water. 4 grams of sodium aluminate at 56% by weight of $Al_2O_3$ are then added. The limpid solution thus obtained is poured, under stirring, into 350 grams of Ludox HS 40 colloidal silica. After brief stirring, a limpid homogenous gel is obtained which is poured into a 1 liter autoclave made of AISI 316, equipped with an anchor stirrer. The gel is left to crystallize under hydrothermal conditions at 160° C. for 60 hours. At the end of this phase, the autoclave is cooled to room temperature. The slurry obtained is homogeneous, with a milky appearance. The slurry is centrifuged. The discharged solid is washed by redispersion in water, centrifuged again, dried at 120° C. and calcined at 550° C. for 5 hours. Upon X-ray diffraction analysis, the solid obtained proves to consist of pure ZSM-12. The solid obtained is subsequently exchanged into ammonia form by treatment with a solution of ammonium acetate 3 M. Upon subsequent calcination at 550° C. for 5 hours, the zeolite in acid form is obtained.

b) Platinum Deposition (1.0% by Weight of Pt)

In order to disperse the platinum onto the zeolite prepared in the previous step (a), an aqueous solution of hexachloroplatinic acid ($H_2PtCl_6$), hydrochloric acid and acetic acid was used, in the following molar ratios: $H_2PtCl_6$/HCl/$CH_3COOH$=1/0.84/0.05, having a platinum concentration of 1.50 g/l. A volume of 200 ml of this solution was added to 30 g of the zeolite prepared as described above, so that all the solid was covered by the solution, to avoid heterogeneity in the platinum distribution. The suspension thus obtained was maintained under stirring for about an hour at room temperature and subsequently degassed by suction under vacuum (about 18 mmHg) at room temperature. The solvent was subsequently removed by heating to about 70° C. under vacuum. The dry product was finally calcined under a stream of air with the following temperature profile 25-350° C. in two hours, 360° C. for 3 hours.

A ZSM-12 zeolite is obtained, containing 1.0% by weight of platinum.

EXAMPLE 2

Preparation of Catalyst B: ZSM-12/1% Ir

A quantity of Iridium equal to 1% by weight is deposited on a ZSM-12 zeolite prepared as described in the previous Example 1, using an aqueous solution of hexachloroiridic acid ($H_2IrCl_6$), hydrochloric acid and acetic acid in the following molar ratios: $H_2IrCl_6$/HCl/$CH_3COOH$=1/0.84/0.05, having an iridium concentration of 0.75 g/l. A volume of 400 ml of this solution was added to 30 g of the solid prepared as described in the previous step (a), so that all the solid is covered by the solution, in order to avoid heterogeneity in the iridium distribution. The suspension thus obtained is maintained under stirring for about an hour at room temperature and subsequently degassed by suction under vacuum (about 18 mmHg) at room temperature. The solvent is subsequently removed by heating to about 70° C. under vacuum. The dry product is finally calcined under a stream of air with the following temperature profile 25-350° C. in two hours, 350° C. for 2 hours, 350-400° C. in 50 min., at 400° C. for 3 hours.

A ZSM-12 zeolite is obtained, containing 1% of Iridium.

EXAMPLE 3

Preparation of Catalyst C: MSA 50/1% Pt
a) Preparation of the MSA Acidic Component 23.5 liters of demineralized water, 19.6 kg of aqueous solution at 14.4% by weight of TPA-OH and 1200 g of aluminum tri-isopropoxide are introduced into a 100 liter reactor. The mixture is heated to 60° C. and maintained under stirring at this temperature for 1 hour, in order to obtain a limpid solution. The temperature of the solution is then brought to 90° C. and 31.1 kg of tetra-ethyl silicate are rapidly added. The reactor is closed and the stirring rate is regulated at about 1.2 m/s, the mixture being maintained under stirring for three hours at a temperature ranging from 80 to 90° C., with thermostatic control to remove the heat produced by the hydrolysis reaction. The pressure in the reactor rises to about 0.2 MPag. At the end, the reaction mixture is discharged and cooled to room temperature, obtaining a homogeneous and relatively fluid gel (viscosity 0.011 Pa·s) having the following composition molar ratios:
$SiO_2/Al_2O_3=50.5$
$TPA.OH/SiO_2=0.093$
$H_2O/SiO_2=15$ The product is left to rest for about 6-8 hours and is then dried by maintaining it in a stream of air at 100° C. until the weight becomes constant. It is finally calcined in a muffle at 550° C. for 8 hours in air.

In this way, a porous solid is obtained, with acidic characteristics, essentially consisting of silica-alumina with a molar ratio $SiO_2/Al_2O_3=50.2$, a BET surface area of 794 m²/g, a pore volume of 0.42 ml/g, an average diameter of 2.1 nm. Upon X-ray analysis, the solid proves to be substantially amorphous, the XRD spectrum from powders does not have a crystalline structure and does not show any peak.

b) Deposition of Platinum (1% by Weight of Pt)

In order to disperse the platinum onto the acidic component, an aqueous solution of hexachloroplatinic acid ($H_2PtCl_6$), hydrochloric acid and acetic acid was used, in the following molar ratios: $H_2PtCl_6/HCl/CH_3COOH=1/0.84/0.05$, having a platinum concentration of 0.75 g/l. A volume of 400 ml of this solution was added to 30 g of the solid prepared as described in the previous step (a), so that all the solid was covered by the solution, to avoid heterogeneity in the platinum distribution. The suspension thus obtained was maintained under stirring for about an hour at room temperature and subsequently degassed by suction under vacuum (about 18 mmHg) at room temperature. The solvent was subsequently removed by heating to about 70° C. under vacuum. The dry product was finally calcined under a stream of air with the following temperature profile 25-350° C. in two hours, 350° C. for 2 hours, 350-400° C. in 50 min., 400° C. for 3 hours.

A silico-alumina of the MSA type is obtained, containing 1% by weight of platinum.

EXAMPLE 4

Preparation of Catalyst D: MSA 50/1% Ir

A quantity of Ir equal to 1% by weight is deposited on an MSA acid component prepared according to step (a) of Example 5, using an aqueous solution of hexachloroiridic acid ($H_2IrCl_6$), hydrochloric acid and acetic acid in the following molar ratios: $H_2IrCl_6/HCl/CH_3COOH=1/0.84/0.05$, having an iridium concentration of 0.75 g/l. A volume of 400 ml of this solution was added to 30 g of the solid prepared as described in the previous step (a), so that all the solid is covered by the solution, in order to avoid heterogeneity in the iridium distribution. The suspension thus obtained is maintained under stirring for about an hour at room temperature and subsequently degassed by suction under vacuum (about 18 mmHg) at room temperature. The solvent is subsequently removed by heating to about 70° C. in a stream of air. The dry product is finally calcined under a stream of air with the following temperature profile 25-350° C. in two hours, 350° C. for 2 hours, 350-400° C. in 50 min., at 400° C. for 3 hours.

A silico-alumina of the MSA type is obtained, containing 1% of Ir.

EXAMPLE 5 (COMPARATIVE)

Catalyst E: $Al_2O_3$—B/1% Pt

An aluminum borate is prepared in accordance with EP 667,184 using the following procedure: 40 g of alumina in extruded form with a surface area of 200 m²/g are immersed in 80 ml of an aqueous solution containing 2.06 g of $H_3BO_3$ and left at 70° C. for 23 hours. The solid is separated from the water by filtration and is then washed on a filter, dried at 120° C. for 16 hours and calcined at 550° C. for 3 hours. Chemical analysis reveals a content of $B_2O_3$ of 2.1% by weight.

Deposition of 1% of Pt 36.075 g of alumina borate obtained in the previous step are impregnated with the incipient wettability technique. 25 cc of solution are required, corresponding to a wettability of 0.693 cc/gr. The solution is prepared by weighing 4.0 g of an aqueous solution at 9.11% of $Pt(NH_3)_4(OH)_2$ brought to a total volume of 25 cc with water. The solution is dried at 120° C. for a night, and is then calcined at 360° C. for 3 hours. An aluminum borate is obtained, containing 1% of Pt.

EXAMPLE 6

Catalytic Test

The catalytic tests were carried out on a continuous laboratory plant shown in FIG. 1. The system consisted of a tubular fixed bed reactor (4) with a useful volume of the charge of 20 cm³ corresponding to a height of the catalytic bed in the isotherm section of 10 cm. The feeding of the charge, contained in the tank (1) and hydrogen to the reactor are effected by means of a dosage pump (2) and a mass flow meter, respectively. The system is also equipped with two gas lines (air and nitrogen) which are used in the regeneration phase of the catalyst. The reactor operates in an equicurrent down flow system. The temperature of the reactor is regulated by means of an oven with two heating elements (3) whereas the temperature control of the catalytic bed is effected by means of a thermocouple (10) positioned inside the reactor. The pressure of the reactor is regulated by means of a valve (8) situated downstream of the reactor. The reaction products are collected in a separator (5) which operates at room temperature and atmospheric pressure. The products leaving the separator (5) pass into a condenser (6) cooled to 5° C. and are subsequently sent to a gas meter (C.L.) (7) and then to the blow-down (B.D.). (9) is the breakage disk. The distribution of the products and conversion level are determined by means of mass balance and gas chromatographic analysis of the reaction products.

Catalysts A, B, C, D and E of examples 1, 2, 3, 4 and 5 were tested in the process of the present invention, in the equipment described above, using hydrotreated LCO as substrate, whose characteristics are indicated in the following Table A.

TABLE A

| Density 15° C., g/cm³ | 0.888 |
|---|---|
| Distillation ASTM D86 | |
| IBP (Initial boiling point) ° C. | 199 |
| 10% v, ° C. | 220 |
| 30% v, ° C. | 246 |
| 50% v, ° C. | 260 |
| 70% v, ° C. | 280 |
| 90% v, ° C. | 312 |
| FBP (final boiling point) ° C. | 342 |
| Cetane index (4 V) | 34.2 |
| Aromatic compounds (HPLC) | |
| Mono-aromatic compounds, w % | 51.1 |
| Diaromatic compounds, w % | 9.1 |
| Triaromatic compounds, w % | 0.6 |
| Sulfur, ppm | 16 |
| Nitrogen, ppm | 2 |
| Hydrogen, % | 12.13 |

The percentage of alkylbenzenes in the hydrotreated charge is equal to 7.6% of the aromatic compounds present.

The hydrotreated charge was obtained by hydrogenation of a commercial LCO, whose characteristics are indicated in Table B, effected in a fixed bed pilot plant with two reactors (RX1, RX2) using a commercial desulfuration catalyst based on nickel and molybdenum (Criterion CR424) under the following operative conditions:
P=75 bars,
WABT (weight average bed temperature) RX1=350° C.
WABT RX2=380° C.
$H_2$/HC=400 Nl/l

TABLE B

| Density 15° C., g/cm³ | 0.923 |
|---|---|
| Distillation ASTM D86 | |
| IBP, ° C. | 203 |
| 10% v, ° C. | 238 |
| 30% v, ° C. | 257 |
| 50% v, ° C. | 272 |
| 70% v, ° C. | 292 |
| 90% v, ° C. | 318 |
| FBP (final boiling point) ° C. | 342 |
| Cetane index (4 V) | 26.8 |
| Aromatic compounds (HPLC) | |
| Mono-aromatic compounds, w % | 21.9 |
| Diaromatic compounds, w % | 43.0 |
| Triaromatic compounds, w % | 4.8 |
| Sulfur, ppm | 2400 |
| Nitrogen, ppm | 461 |
| Hydrogen, % | 10.42 |

During the hydrotreatment, in addition to the removal of sulfur and nitrogen, there is the transformation of most of the polyaromatic compounds into the corresponding naphthobenzene compounds.

Before being tested, the catalysts were activated as follows:

1) 1 hour at room temperature in a nitrogen stream;
2) 1 hour at 50° C. in a hydrogen stream;
3) heating from room temperature to 380° C. with a profile of 3° C./min in a hydrogen stream;
4) the temperature is kept constant at 380° C. for 3 hours in a hydrogen stream, and is then cooled to 200° C.

During the activation, the pressure in the reactor is maintained at between 2.0 and 6.0 MPa (20 and 60 atm).

The results of the conversion of the hydrotreated charge using catalysts A, B, C, D and E, described in Examples 1, 2, 3, 4, and 5 respectively, are indicated in Table C.

In Table C:

The Yield 180+° C. SIMDIST 2887 is the percentage of the products with a boiling point higher than 180° C., determined by simulated distillation SIMDIST 2887;

The Cetane Index (4v) 180+° C. is the cetane number of the products, with a boiling point higher than 180° C., determined by means of the distillate D86 and density at 15° C.;

T95° C. SIMDIST 2887 is the temperature at which 95% of the products are distilled, determined by simulated distillation SIMDIST 2887.

All the tests were effected using an $H_2$/HC ratio of 2000 Nlt/Kg.

The data in the first line of Table B refer to the characteristics of the hydrotreated blend before being fed to the process of the present invention.

The data indicated in the last column of Table C represent the relative hydrogen consumption taking 100% as the hydrogen consumption obtained using the comparative catalyst E at 280° C.

The data indicated in the table show that the use of catalysts A, B, C and D lead to a considerable increase in the cetane number, up to 14 numbers, against a yield at 180+° C. again higher than 85%. Both the density and the T95 undergo a considerable reduction, following treatment according to the process of the present invention. On examining the data indicated in Table B, it can be seen that in the case of catalyst E improvements in the characteristics of the charge, in terms of density and cetane number, similar to those obtained with catalysts A, B, C and D require a more extensive dearomatization and a much higher hydrogen consumption.

TABLE C

| Catal. | Temp. ° C. | Pressure Atm | WHSV hours⁻¹ | Yield 180+ ° C. SIMDIST 2887 | Cetane Index (4 v) 180+ ° C. | Aromatic products w % | Density 15° C. Kg/l | T 95° C. SIMDIST 2887 | $H_2$ % relative consumption |
|---|---|---|---|---|---|---|---|---|---|
| LCO-HDT | — | — | — | 2.0 | 34 | 60.8 | 0.888 | 344 | — |
| B | 300 | 60 | 1 | 86.7 | 38 | 40.7 | 0.857 | 309 | 43 |
| B | 290 | 80 | 2 | 94.9 | 43 | 29.7 | 0.857 | 324 | 52 |
| A | 290 | 20 | 1 | 89.8 | 36 | 40.6 | 0.860 | 315 | 34 |
| A | 270 | 20 | 1 | 95.4 | 42 | 20.9 | 0.854 | 320 | 71 |
| C | 310 | 20 | 1 | 93.9 | 48 | 9.6 | 0.839 | 326 | 83 |
| C | 280 | 10 | 1 | 99.2 | 38 | 42.8 | 0.869 | 342 | 41 |
| D | 290 | 40 | 1 | 95.9 | 45 | 20.9 | 0.852 | 333 | 69 |

TABLE C-continued

| Catal. | Temp. °C. | Pressure Atm | WHSV hours⁻¹ | Yield 180+ °C. SIMDIST 2887 | Cetane Index (4 v) 180+ °C. | Aromatic products w % | Density 15° C. Kg/l | T 95° C. SIMDIST 2887 | H₂ % relative consumption |
|---|---|---|---|---|---|---|---|---|---|
| D | 290 | 20 | 1 | 96.9 | 39 | 44.8 | 0.866 | 335 | 47 |
| E | 280 | 30 | 1 | 99.5 | 43 | 0.8 | 0.848 | 340 | 100 |
| E | 340 | 30 | 1 | 99.4 | 40 | 22.6 | 0.861 | 345 | 73 |

EXAMPLE 7

Catalytic Test

The catalytic tests were carried out on a pilot plant in continuous. The system consisted of a 1825 mm fixed bed tubular reactor having an internal diameter of 40 mm with a useful charge volume of 800 cm³. The feeding of the charge, contained in the tank and of the hydrogen to the reactor are effected by means of a dosage pump and mass flow meter, respectively. The reactor runs in an equicurrent down flow system. The temperature of the reactor is regulated by means of six electrically heated outer blocks whereas the temperature control of the catalytic bed is effected by means of 18 thermocouples positioned inside the reactor in a sheath having an outer diameter of 10 mm. The pressure of the reactor is regulated by means of a valve situated down-stream of the reactor. The gases are separated in a separator which operates under pressure and the reaction products are collected in a separator which operates at room temperature and atmospheric pressure. The products leaving the high and low pressure separator pass into a cooled condenser and are subsequently sent to a gas meter and then to the blow-down. The distribution of the products and the conversion level are determined by means of mass balance and gas chromatographic analysis of the reaction products.

In the plant described above, the hydrotreated charge, described in Example 6, in Table A, and the hydrogen were passed onto catalyst D based on Ir supported on mesoporous amorphous MSA silico-alumina, prepared according to Example 4. 255 g of catalyst pelleted and granulated to 0.5-1 mm (corresponding to a volume of 420 ml) diluted 1/1 v/v with SiC (carborundum), were charged.

Before being tested, the catalyst was activated as follows:
1. pressurizing the reactor in H₂ at 50 bars at room temperature
2. flushing with 200 l/hour of H₂ and raising the T to 110° C. at 30° C./hour
3. maintaining the conditions for 2 hours
4. raising the T to 330° C. at 50° C./hour
5. maintaining the conditions for 2 hours
6. bringing the temperature to 200° C. and stabilizing for 72 hours.

The product was obtained under the following conditions:
WHSV=0.7 hours⁻¹
H₂/HC=1500 Nlt/lt
Pressure=30 bars
WABT=270° C.

The properties of the product obtained are indicated in Table D below:

TABLE D

| Density 15° C., g/cm³ | 0.848 |
|---|---|
| Distillation ASTM D86 | |
| IBP, ° C. | 152 |
| 10% v, ° C. | 206 |
| 30% v, ° C. | 226 |
| 50% v, ° C. | 242 |
| 70% v, ° C. | 261 |
| 90% v, ° C. | 302 |
| FBP, ° C. | 342 |
| Cetane index (4 V) | 42.1 |
| Aromatic compounds (HPLC) | |
| Mono-aromatic compounds, w % | 19.4 |
| Diaromatic compounds, w % | 0.2 |
| Triaromatic compounds, w % | 0.0 |
| Sulfur, ppm | <1 |
| Nitrogen, ppm | <1 |
| Hydrogen, % | 13.83 |

The percentage of alkylbenzenes in the product is equal to 45.8% of the residual aromatic compounds.

EXAMPLE 8

A test was carried out, with catalyst E described in Example 5, using the same preparation and activation procedure described in the case of the catalyst evaluated in Example 7, under the following operating conditions:
WHSV=0.7 hours⁻¹
H₂/HC=1500 Nlt/lt
Pressure=30 bars
WABT=260° C.

The properties of the product obtained are indicated in Table E:

TABLE E

| Density 15° C., g/cm³ | 0.849 |
|---|---|
| Distillation ASTM D86 | |
| IBP, ° C. | 186 |
| 10% v, ° C. | 214 |
| 30% v, ° C. | 229 |
| 50% v, ° C. | 244 |
| 70% v, ° C. | 264 |
| 90% v, ° C. | 303 |
| FBP, ° C. | 347 |
| Cetane index (4 V) | 43.0 |
| Aromatic compounds (HPLC) | |
| Mono-aromatic compounds, w % | 0.8 |
| Diaromatic compounds, w % | 0.0 |
| Triaromatic compounds, w % | 0.0 |
| Sulfur, ppm | <1 |
| Nitrogen, ppm | <1 |
| Hydrogen, % | 14.35 |

The data in Tables C and D show that the use of catalyst D described in Example 4 (Ir/MSA) leads to the formation of products with a density and cetane number very similar to those of the products obtained with catalyst E described in Example 5 (Al₂O₃—B/1% Pt).

Against this, the products obtained according to Example 7 have a higher content of aromatic compounds and a much lower hydrogen content.

The invention claimed is:

1. A process for improving the properties as a fuel of hydrotreated hydrocarbon blends by increasing the cetane index and reducing the density and T95 which comprises:
contacting said hydrotreated hydrocarbon blends with hydrogen, in the presence of a catalytic system, comprising:
a) one or more metals selected from the group consisting of Pt, Pd, Ir, Ru, Rh and Re, and
b) a silico-aluminate of an acidic nature selected from the group consisting of a zeolite belonging to the MTW family and a completely amorphous micro-mesoporous silico-alumina, wherein the completely amorphous silico-alumina has a molar ratio $SiO_2/Al_2O_3$ ranging from 30 to 500, a surface area greater than 500 m$^2$/g, a pore volume ranging from 0.3 to 1.3 ml/g, and an average pore diameter lower than 40 Å wherein said hydrotreated hydrocarbon blends comprise one or more benzonaphthene compounds and wherein the contacting converts at least a portion of the benzonaphthene compounds to one or more alkylbenzene compounds.

2. The process according to claim 1, wherein the zeolite is an MTW family zeolite that is ZSM-12 zeolite.

3. The process according to claim 1, wherein the micro-mesoporous silico-alumina has a molar ratio $SiO_2/Al_2O_3$ ranging from 50/1 to 300/1.

4. The process according to claim 1, wherein the micro-mesoporous silico-alumina has a porosity ranging from 0.4 to 0.5 ml/g.

5. The process according to claim 1, wherein the micro-mesoporous silico-alumina has a powder XRD spectrum which does not have a crystalline structure and does not show any peak.

6. The process according to claim 1, wherein the metal contained in the catalytic system is selected from the group consisting of platinum, iridium and their mixtures.

7. The process according to claim 1, wherein the metal or mixture of metals contained in the catalytic system is present in a quantity ranging from 0.1 to 5% by weight with respect to the total weight of the catalytic composition.

8. The process according to claim 7, wherein the metal or mixture of metals is present in a quantity ranging from 0.3 to 1.5% by weight with respect to the total weight of the catalytic composition.

9. The process according to claim 1, wherein the hydrotreated hydrocarbon blend is at least one of a hydrotreated hydrocarbon oil cut and a hydrotreated hydrocarbon cut of a petrochemical origin.

10. The process according to claim 9, wherein the hydrotreated hydrocarbon blend is obtained by the hydrotreatment of oil cuts or cuts of a petrochemical origin, with a content of aromatic compounds higher than 20% by weight.

11. The process according to claim 10, wherein the cuts which are hydrotreated have a content of aromatic compounds higher than 40% by weight.

12. The process according to claim 11, wherein the hydrotreated hydrocarbon blend is at least one selected from the group consisting of hydrotreated naphtha, hydrotreated diesel, hydrotreated kerosene, hydrotreated jet fuel, hydrotreated LCO, hydrotreated HVGO, a hydrotreated FCC heavy fraction, and hydrotreated FOK.

13. The process according to claim 10, wherein the hydrotreated hydrocarbon blend is at least one selected from the group consisting of hydrotreated naphtha, hydrotreated diesel, hydrotreated kerosene, hydrotreated jet fuel, hydrotreated LCO, hydrotreated HVGO, a hydrotreated FCC heavy fraction, and hydrotreated FOK.

14. The process according to claim 1, wherein the contacting is carried out at a temperature ranging from 240 to 380° C., at a pressure ranging from 20 to 100 atm, at a WHSV ranging from 0.5 to 5 hours$^{-1}$ and with a ratio between hydrogen and charge ($H_2$/HC) ranging from 400 to 2000 Nlt/kg.

15. The process according to claim 14, wherein the acidic component (b) is a zeolite of the MTW type, the pressure is greater than 20 atm and lower than or equal to 80 atm, and the temperature ranges from 250 to 330° C.

16. The process according to claim 14, wherein the acidic component (b) is a silico-alumina, the pressure is greater than 20 atm and lower than or equal to 80 atm, and the temperature ranges from 300 to 380° C.

17. The process according to claim 1, wherein the hydrotreated hydrocarbon blends are obtained by the treatment of hydrocarbon blends with hydrogen in the presence of one or more catalysts containing one or more of a metal of group VI and a metal of group VIII, and an amorphous carrier.

18. The process according to claim 17, wherein the metal of group VI contained in the hydrotreatment catalyst is selected from the group consisting of molybdenum, tungsten and their mixtures.

19. The process according to claim 17, wherein the metal of group VIII contained in the hydrotreatment catalyst is selected from the group consisting of nickel, cobalt and their mixtures.

20. The process according to claim 17, wherein the carrier contained in the hydrotreatment catalyst is selected from the group consisting of alumina and silica-alumina.

21. The process according to claim 17, wherein the hydrotreatment of the hydrocarbon blends is carried out at a temperature ranging from 200° C. to 400° C., and at a pressure ranging from 20 to 100 bars.

22. The process according to claim 1,
wherein the contacting includes hydrodecyclization of naphthene rings of the benzonaphthene compounds.

23. The process of claim 22, wherein the contacting forms a hydrocarbon composition that is (i) enriched in alkyl-benzene compounds in comparison to the hydrotreated hydrocarbon blends, (ii) has an increased cetane index in comparison to the hydrotreated hydrocarbon blends, (iii) has a decreased density in comparison to the hydrotreated hydrocarbon blends, and (iv) has a decreased T95 in comparison to the hydrotreated hydrocarbon blends, and
wherein the hydrocarbon composition is obtained with a consumption of hydrogen that is lower than the consumption of hydrocarbon required to achieve an equivalent reduction in density by a process that comprises dearomatization of the hydrotreated hydrocarbon blends with hydrogen.

24. The process according to claim 1, comprising:
contacting the hydrotreated blends with hydrogen in the presence of a catalytic system comprising:
one or more metals selected from the group consisting of Pt, Pd, Ir, Ru, Rh and Re, and
a completely amorphous micro-mesoporous silico-alumina, having a molar ratio $SiO_2/Al_2O_3$ of from 30 to 500, a surface area greater than 500 m$^2$/g, a pore volume of from 0.3 to 1.3 ml/g, and an average pore diameter lower than 40 Å.

25. The process according to claim 1, wherein said hydrotreated hydrocarbon blends comprise at least one selected from the group consisting of a hydrotreated naphtha, a hydrotreated diesel, a hydrotreated kerosene, a hydrotreated jet fuel, a hydrotreated LCO, a hydrotreated HVGO, a hydrotreated FCC heavy fraction and a hydrotreated FOK.

26. The process according to claim 1, wherein the contacting includes contacting the benzonapththene compounds with the catalytic system as a single catalyst to convert the benzonapththene compounds to the alkylbenzene compounds.

27. The process according to claim 1, wherein the benzonaopththene compounds are converted to alkylbenzene compounds with a catalytic system that consists of (a) and (b).

28. The process according to claim 1, wherein the contacting is carried out in a reactor containing the catalytic system and the benzonapththene compounds are converted to the alkylbenzene compounds in the reactor.

29. The process according to claim 28, wherein the catalytic system is a single zone in the reactor.

* * * * *